(12) United States Patent
Saeki et al.

(10) Patent No.: US 7,824,269 B2
(45) Date of Patent: Nov. 2, 2010

(54) TORQUE FLUCTUATION ABSORBING APPARATUS

(75) Inventors: Tomohiro Saeki, Anjo (JP); Masanori Suzuki, Kariya (JP); Daisuke Hayashi, Anjo (JP); Makoto Takeuchi, Obu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 411 days.

(21) Appl. No.: 11/979,934

(22) Filed: Nov. 9, 2007

(65) Prior Publication Data
US 2008/0110719 A1 May 15, 2008

(30) Foreign Application Priority Data
Nov. 10, 2006 (JP) .............................. 2006-305262

(51) Int. Cl.
*F16F 15/129* (2006.01)
(52) U.S. Cl. ...................................... 464/68.41; 464/46
(58) Field of Classification Search .................. 464/46, 464/68.4, 68.41; 192/210.1, 213.12, 213.22, 192/213.31, 214.1
See application file for complete search history.

(56) References Cited

U.S. PATENT DOCUMENTS

| 5,820,466 A * | 10/1998 | Graton et al. ............ 464/68.41 |
| 7,377,853 B2 * | 5/2008 | Takeuchi et al. .............. 464/46 |
| 2006/0102444 A1 * | 5/2006 | Kitada ................ 192/213.22 X |

FOREIGN PATENT DOCUMENTS

JP  2002-13547 A  1/2002

* cited by examiner

*Primary Examiner*—Greg Binda
(74) *Attorney, Agent, or Firm*—Buchanan Ingersoll & Rooney PC

(57) ABSTRACT

A torque fluctuation absorbing apparatus includes a hub member with a flange portion, first and second side-plates provided at both axial sides of the flange portion, respectively, a damper mechanism absorbing a fluctuation of a relative torque generated between the flange portion of the hub member and the first and second side-plates, a thrust member provided between the first side-plate and the flange portion of the hub member, and a first disc spring provided between the first side-plate and the thrust member and biasing the thrust member towards the flange portion of the hub member. The first side plate includes a bent portion bent towards the flange portion of the hub member and a bore formed at the bent portion, and the thrust member is formed with an engagement portion extending through the bore of the first side-plate and engaged with the bore of the first side-plate.

12 Claims, 13 Drawing Sheets

First embodiment

Comparative example

TORQUE FLUCTUATION ABSORBING APPARATUS

CROSS REFERENCE TO RELATED APPLICATIONS

This application is based on and claims priority under 35 U.S.C. §119 to Japanese Patent Application 2006-305262, filed on Nov. 10, 2006, the entire content of which is incorporated herein by reference.

FIELD OF THE INVENTION

The present invention relates to a torque fluctuation absorbing apparatus.

BACKGROUND

A torque fluctuation absorbing apparatus, for example which is mounted on a hybrid driving apparatus including an engine and an electric motor as power sources, is provided at an output shaft of the engine and/or of the electric motor and absorbs (controls) a fluctuating torque generated by the engine and the electric motor. A known art of the torque fluctuation absorbing apparatus is disclosed in Japanese Patent No. 2002-13547 (hereinafter, referred to as reference 1). The torque fluctuation absorbing apparatus (a damper for a hybrid driving apparatus) disclosed in reference 1 includes a limiter mechanism which intercepts a power transmittance when a fluctuating torque generated by first and second power source achieves a predetermined value. The limiter mechanism is configured to allow a slip of a torsion member which controls the fluctuating torque generated between a first rotation member rotatably driven by the first power source and a second rotation member connected to the second power source, when the fluctuating torque between the first and second rotation members achieves the predetermined value, hence an excessive torque is prevented from being inputted from the first rotation member to the second rotation member.

According to the torque fluctuation absorbing apparatus (the damper for the hybrid driving apparatus) disclosed in the reference 1, in order to ensure a required limit torque in response to an increase of an output of the engine, the size of the torsion member is required to be larger. In the mean time, a size of a disc spring, which presses and connects the torsion member to the first and second rotation members, also becomes larger. Accordingly, an entire size of the torque fluctuation absorbing apparatus may be increased, and downsizing the apparatus may be difficult. Especially, when the size of the torque fluctuation absorbing apparatus is increased for ensuring the required limit torque value, it may be difficult to mount the torque fluctuation absorbing apparatus on an FF-type vehicle which includes a large space in an axial direction and requires to constrain space.

A need thus exists for a torque fluctuation absorbing apparatus which is not susceptible to the drawback mentioned above.

SUMMARY OF THE INVENTION

According to an aspect of the present invention, a torque fluctuation absorbing apparatus arranged between a driving-side member and a driven-side member and absorbing a fluctuation of the relative torque includes a hub member, first and second side-plates, a damper mechanism, a thrust member and a first disk spring. The hub member is connected to the driven-side member and including a flange portion extending radially outwardly. The first and second side-plates is connected to the driving-side member and provided at both axial sides of the flange portion, respectively. The damper mechanism is accommodated in a window portion formed at each of the first and second side-plates and the flange portion of the hub member. Further, the damper mechanism absorbs a fluctuation of a relative torque generated between the flange portion of the hub member and the first and second side-plates. The thrust member is provided between the first side-plate and the flange portion of the hub member. The first disc spring is provided between the first side-plate and the thrust member and biases the thrust member towards the flange portion of the hub member. The first side-plate includes a bent portion bent towards the flange portion of the hub member and a bore formed at the bent portion. The thrust member is formed with an engagement portion extending through the bore of the first side-plate and engaged with the bore of the first side-plate.

BRIEF DESCRIPTION OF THE DRAWINGS

The foregoing and additional features and characteristics of the present invention will become more apparent from the following detailed description considered with reference to the accompanying drawings, wherein:

In FIG. 1, bolts 28 are not illustrated;

DETAILED DESCRIPTION

A first embodiment of a torque fluctuation absorbing apparatus according to the present invention will be described hereinafter with attached drawings.

Figure 1:
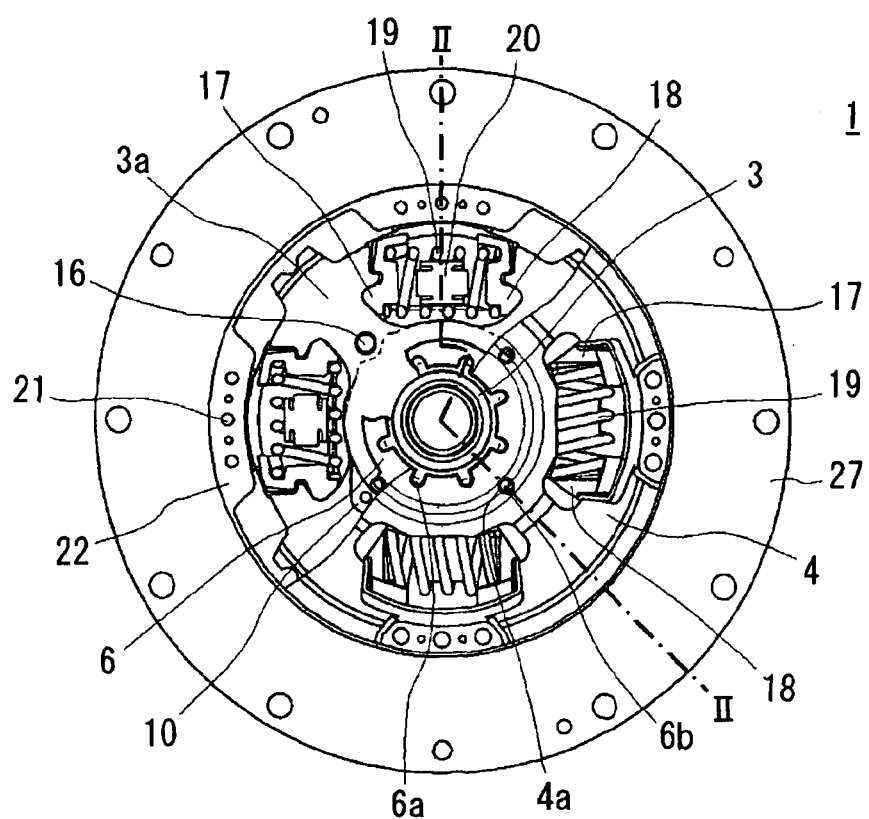
FIG. 1 is a cutout plan view schematically illustrating a structure of a torque fluctuation absorbing apparatus according to a first embodiment of the present invention.
Figure 2:
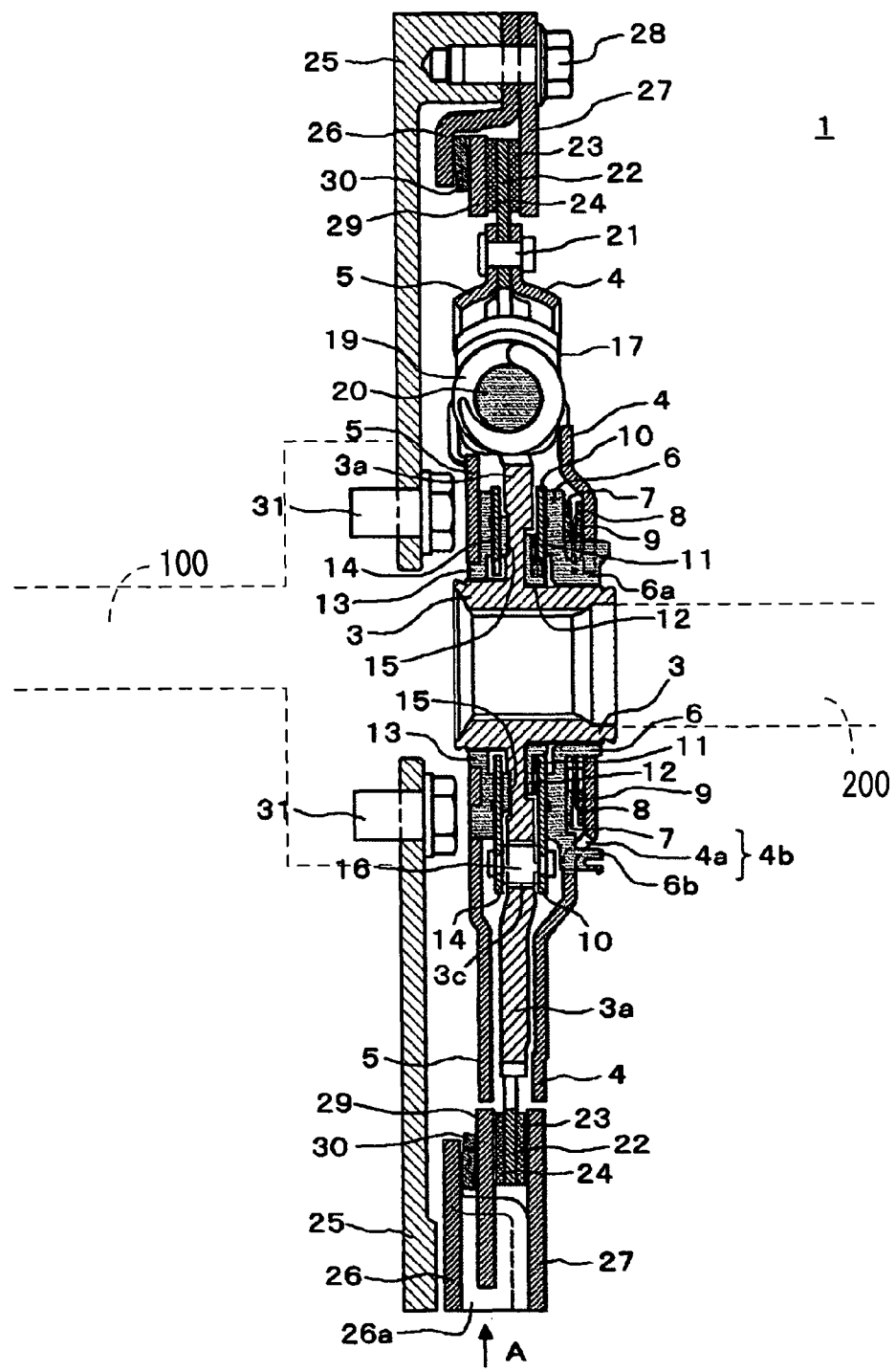
FIG. 2 is a cross-sectional view schematically illustrating the structure of the torque fluctuation absorbing apparatus taken along a line II-II, according to the first embodiment.
Figure 3A:
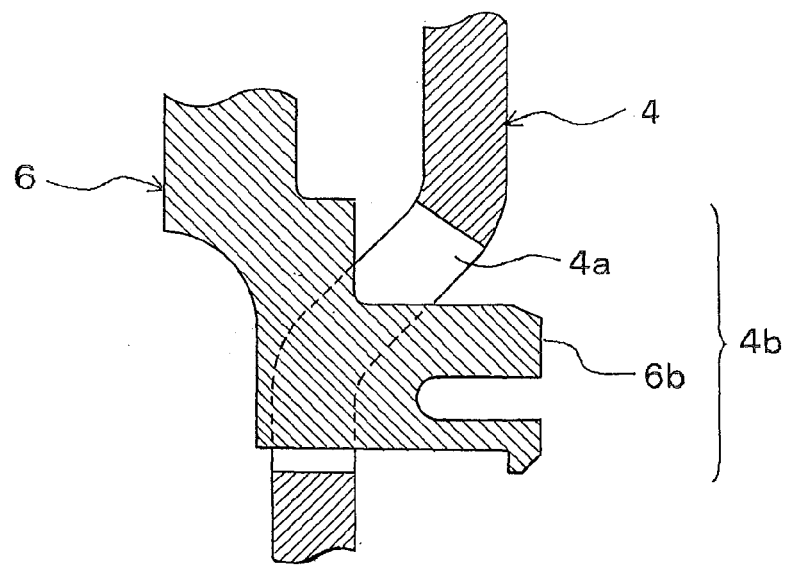
FIG. 3A is an enlarged cross-sectional view schematically illustrating arrangements of a side plate and a thrust member of the torque fluctuation absorbing apparatus according to the first embodiment.
Figure 3B:
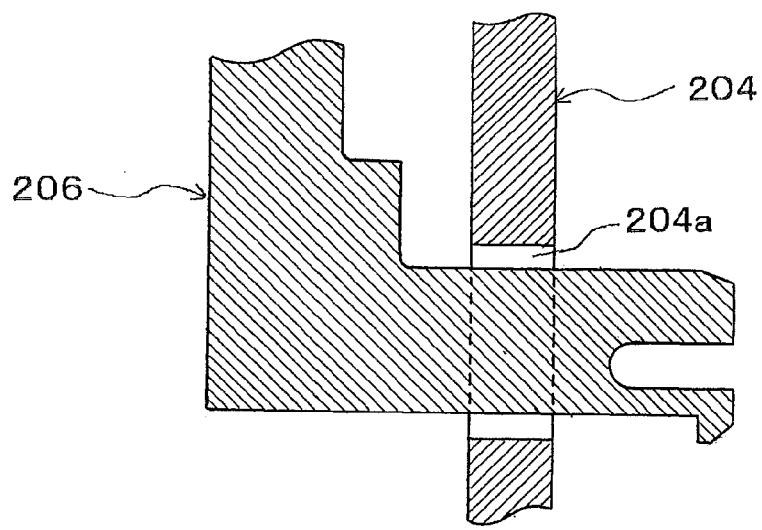
FIG. 3B is an enlarged cross-sectional view schematically illustrating arrangements of a side plate and a thrust member of a torque-fluctuation absorbing apparatus according to a comparative example.
Figure 4A:
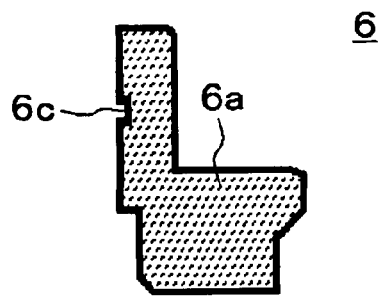
FIG. 4A is an enlarged cross-sectional view illustrating a structure of a thrust member of the torque fluctuation absorbing apparatus according to the first embodiment.
Figure 4B:
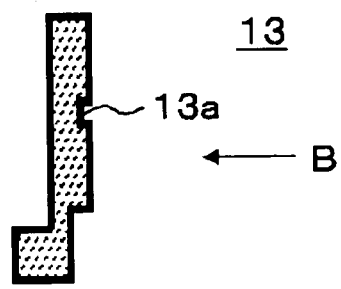
FIG. 4B is an enlarged cross sectional view illustrating a structure of a thrust member of the torque fluctuation absorbing apparatus according to the first embodiment.
Figure 4C:
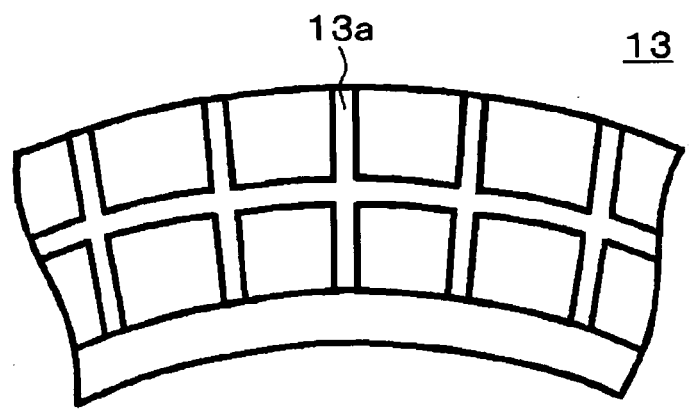
FIG. 4C is an enlarged plan view illustrating the structure of the thrust member seen from a direction of an arrow B in FIG. 4B, according to the first embodiment.
Figure 5:
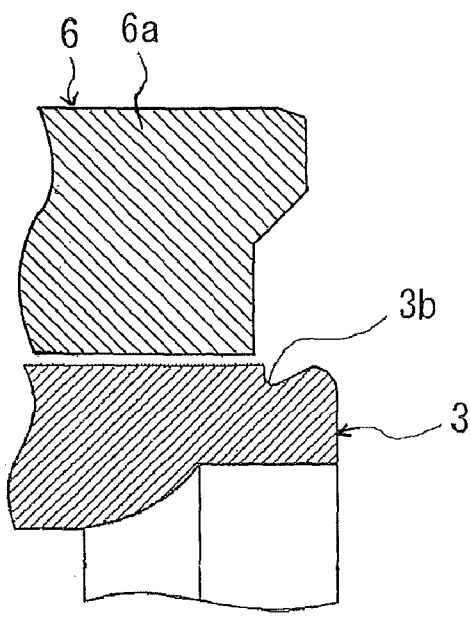
FIG. 5 is an enlarged cross-sectional view schematically illustrating arrangements of the thrust member and a hub member of the torque fluctuation absorbing apparatus according to the first embodiment.
Figure 6:
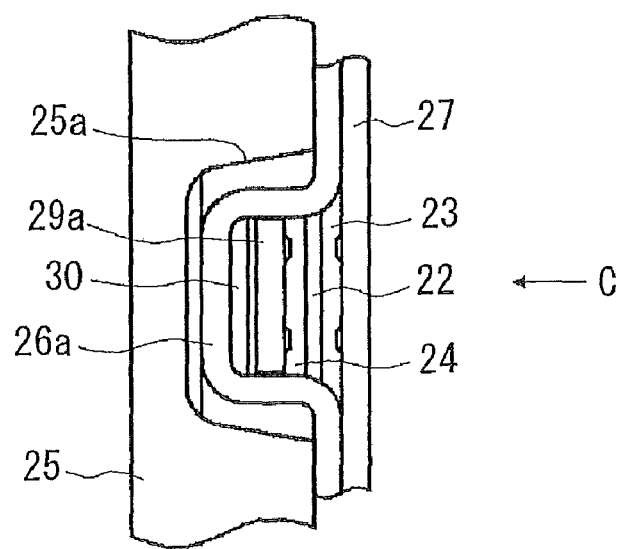
FIG. 6 is an enlarged plan view of the torque fluctuation absorbing apparatus seen from a direction of an arrow A in FIG. 2.
Figure 7:
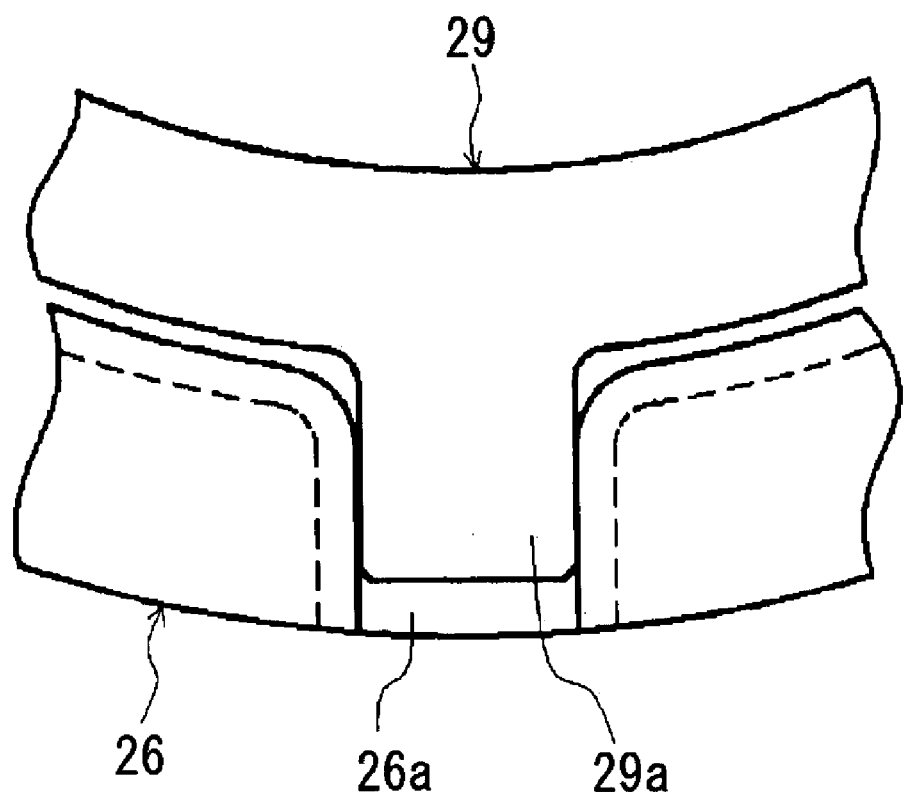
FIG. 7 is an enlarged plan view schematically illustrating arrangements of a pressure plate and a support plate of the torque fluctuation absorbing apparatus seen from a direction of an arrow C illustrated in FIG. 6, according to the first embodiment.

FIG. 1 is a cutout plan view schematically illustrating a structure of the torque fluctuation absorbing apparatus, generally indicated by reference numeral 1, according to the first embodiment of the present invention. FIG. 2 is a cross-sectional view schematically illustrating the structure of the torque fluctuation absorbing apparatus 1, taken along a line II-II, according to the first embodiment. FIG. 3A is an enlarged cross-sectional view schematically illustrating arrangements of a side-plate 4 and a thrust member 6 of the torque fluctuation absorbing apparatus 1 according to the first embodiment, and FIG. 3B is an enlarged cross-sectional view schematically illustrating arrangements of a side plate and a thrust member according to a comparative example. FIGS. 4A, 4B and 4C are schematic views illustrating the structures of the thrust members of the torque fluctuation absorbing apparatus 1 according to the first embodiment. More specifically, FIG. 4A is an enlarged cross-sectional view of the thrust member 6 and FIG. 4B is an enlarged cross-sectional view of a thrust member 13. FIG. 4C is an enlarged plan view of the thrust member 13 seen from a direction of an arrow B illustrated in FIG. 4B. FIG. 5 is an enlarged cross-sectional view schematically illustrating arrangements of the thrust member 6 and a hub member 3 of the torque fluctuation absorbing apparatus 1 according to the first embodiment. FIG. 6 is an enlarged plan view of the torque fluctuation absorbing apparatus 1 seen from a direction of an arrow A illustrated in FIG. 2. FIG. 7 is an enlarged plan view of the torque fluctuation absorbing apparatus 1 seen from a direction of an arrow C illustrated in FIG. 6 and schematically illustrating arrangements of a pressure plate 29 and a support plate 26 of the torque fluctuation absorbing apparatus 1 according to the first embodiment. In FIG. 1, bolts 28 are not illustrated.

For example in a hybrid driving apparatus, the torque fluctuation absorbing apparatus 1 according to the first embodiment is provided between an output shaft 100 (serving as a driving-side member) of an engine (not illustrated) and an input shaft 200 (serving as a driven-side member) of a transmission (not illustrated) and employed for transmitting a relative torque and for absorbing or controlling a fluctuating torque generated by the engine (not illustrated) and an electric motor (not illustrated). The torque fluctuation absorbing apparatus 1 is operated to absorb or reduce a torque fluctuation and is configured with the hub member 3, the side-plate 4 (serving as a first side-plate), a side-plate 5 (serving as a second side-plate), the thrust member 6, a disc spring 7 (serving as a first disc spring), an intermediate plate 8, a disc spring 9 (serving as a first disc spring), a control plate 10, a disc spring 11, thrust members 12 and 13, a control plate 14, a thrust member 15, pin members 16, spring sheets 17 and 18, coil springs 19, elastic members 20, rivets 21, an intermediate plate 22, frictional members 23 and 24 (serving as first and second frictional members), a rotational member 25, the support plate 26, a cover plate 27, the bolts 28, the pressure plate 29, a disc spring 30 (serving as a second disc plate) and bolts 31.

As best shown in FIGS. 1, 2 and 5, the hub member 3 is a member radially inwardly spline-engaged with an input shaft 200 of a transmission (not illustrated). The hub member 3 includes a flange portion 3a extending radially outwardly. The flange portion 3a is formed with window portions at its radially intermediate area. Each window portion of the flange portion 3a is provided for accommodating the coil spring 19, the spring sheet 17, the spring sheet 18 and the elastic member 20. The coil spring 19, the spring sheets 17, 18 and the elastic member 20 are included in a damper mechanism. In addition, both circumferential ends of each window portion of the flange portion 3a separably contact with the spring sheets 17 and 18, respectively. More specifically, when a torsional force is generated and one of the spring sheets 17 and 18 is separated from the corresponding circumferential end of the window portion, the other of the spring sheets 17 and 18 is in contact with the other corresponding circumferential end of the window portion. As best shown in FIG. 2, the flange portion 3a further includes a first recess at the surface thereof facing the side-plate 4 side (a right side in FIG. 2) and at an area of the surface where the thrust member 12 is in contact. Thus, the flange portion 3a is slidably in contact with the thrust member 12 at the first recess. Further, the flange portion 3a includes a second recess at the surface thereof facing the side-plate 5 side (a left side in FIG. 2) and at an area of the surface where the thrust member 15 is in contact. Thus, the flange portion 3a is slidably in contact with the thrust member 15 at the second recess. It is preferable for the first and second recesses of the flange portion 3a to be formed at the vicinity of a radially inner portion of the hub member 3 because the vicinity of a radially inner portion of the flange portion 3a is less influenced by the strength. It is further preferable that a thickness of an area of the flange portion 3a having the first and second recesses is reduced between 15 percent and 50 percent relative to a thickness of the other area of the flange portion 3a not formed with the first and second recesses. Therefore, an axial length of the torque fluctuation absorbing apparatus 1 can be reduced. In addition, the flange portion 3a includes window portions 3c to which the pin members 16 are inserted, respectively. A diameter of each window portion 3c is formed to be larger than a diameter of an intermediate portion of each pin member 16. Accordingly, the window portions 3c guide rotations of the pin members 16 relative to the flange portion 3a. Still further, the hub member 3 includes grooves 3b respectively formed at an outer circumferential surface at both axial ends, thereby preventing grease from infiltrating.

The side-plate 4 is an annular plate member formed into a predetermined shape (see FIGS. 1, 2 and 3A). With reference to FIG. 2, the side-plate 4 is provided at axially right side of the flange portion 3a. The side-plate 4 includes a plurality of recesses at an inner periphery. The plurality of recesses of the side-plate 4 are fitted with a plurality of detent portions 6a of the thrust member 6, respectively, so that the side-plate 4 is prohibited from rotating relative to the thrust member 6 and is allowed to move in the axial direction. The side-plate 4 is in contact with one end of the disc spring 9 at the surface thereof facing the flange portion 3a side (a left side shown in FIG. 2). The side-plate 4 includes a bent portion 4b which is bent towards the flange portion 3a of the hub member 3 at a radially outer side from an area where the side-plate 4 contacts with the disc spring 9. The side-plate 4 further includes, at its bent portion 4b, bores 4a through which engagement portions 6b of the thrust member 6 extends, respectively (see FIG. 3A). The bores 4a of the side-plate 4 are formed at a vicinity of the hub member 3. As will be apparent from FIG. 3A in comparison with FIG. 3B, according to the first embodiment of the present invention, an axial length of the engagement portion 6b of the thrust member 6 can be arranged to be smaller because the bores 4a of the side-plate 4 are formed at the bent portion 4b thereof, hence the axial length of the torque fluctuation absorbing apparatus 1 can be reduced. The side-plate 4 includes window portions at its radially intermediate portion. Each window portion of the side-plate 4 is provided for accommodating the coil spring 19, the spring sheet 17, the spring sheet 18 and the elastic member 20. In addition, both circumferential ends of each window portion of the side-plate 4 separably contact with the spring sheets 17 and 18, respectively. More specifically, when the torsional force is generated and one of the spring sheets 17 and 18 is separated from the corresponding circumferential end of the window portion of the side-plate 4, the other of the spring sheets 17 and 18 is in contact with the other corresponding circumferential end of the window portion. The side-plate 4 is secured to the side-plate 5 and the intermediate plate 22 by means of the rivets 21, at a radially outer portion relative to the coil springs 19.

The side-plate 5 is an annular plate member formed into a predetermined shape (see FIG. 2). With reference to FIG. 2, the side-plate 5 is provided at axially left side of the flange portion 3a (the left side in FIG. 2). The side-plate 5 is in contact with the thrust member 13 at an inner peripheral end and at a proximal area of a radially inner portion. The side-plate 5 includes bores fitted with detent portions of the thrust member 13, so that the side-plate 5 is prohibited from rotating relative to the thrust member 13 and allowed to move in the axial direction. The side-plate 5 includes window portions at a radially intermediate portion. Each window portion of the side-plate 5 is provided for accommodating the coil spring 19, the spring sheet 17, the spring sheet 18 and the elastic member 20. In addition, both circumferential ends of each window portion of the side-plate 5 separably contact with the spring sheets 17 and 18, respectively. More specifically, when a torsional force is generated and one of the spring sheets 17 and 18 is separated from the corresponding circumferential end of the window portion of the side-plate 5, the other of the spring sheets 17 and 18 is in contact with the other corresponding circumferential end of the window portion. The side-plate 5 is secured to the side-plate 4 and the intermediate plate 22 by means of the rivets 21, at a radially outer portion relative to the coil springs 19. Additionally, the side-plates 4 and 5 are connected to the output shaft 100 of the engine (not illustrated) via the rotational member 25 and the frictional members 23, 24.

The thrust member 6 is provided at an outer periphery of the hub member 3 and arranged between the disc spring 7 and the control plate 10 (see FIGS. 1, 2, 3A, 4A and 5). The thrust member 6 and the control plate 10 are slidably in contact with one another. The thrust member 6 is biased towards the control plate 10 by the disc spring 7. The thrust member 6 includes the detent portions 6a at a radially inner portion extending towards the side-plate 4. The detent portions 6a of the thrust member 6 is provided for prohibiting the thrust member 6 from rotating relative to the side-plate 4, the disc springs 7, 9, and the intermediate plate 8 and for allowing the thrust member 6 to move in the axial direction. As best shown in FIG. 5, an inner portion of an end surface of each detent portion 6a exposes the groove portion 3b of the hub member 3. An outer portion of the end surface of each detent portion 6a is structured to be higher than the inner portion of the end surface of each detent portion 6a so as to assure a guide function for guiding the grease when rotating. Therefore, even when the grease is adhered to the inner portion of the end portion of the detent portion 6a, the grease is prevented from infiltrating into the torque fluctuation absorbing apparatus 1. Additionally, such effect may be increased by arranging corners of the inner and outer portions of the end surface to be taper-shaped, respectively. In addition, the thrust member 6 is formed with the engagement portions 6b extending through the bores 4a of the side-plate 4 and engaged therewith, respectively. The engagement portions 6b are formed at an inner circumferential portion of the thrust member 6. The engagement portion 6b serves as a stopper, or a detent, relative to the side-plate 4 and plays a role of holding the disc spring 7 and 9, the intermediate plate 8, or the like and structuring a sub-assembly. In addition, each engagement portion 6b is formed with a pawl portion, which prevents the engagement portion 6b from being released from the side-plate 4. The thrust member 6 is formed with a groove pattern 6c at a surface contacting with the control plate 10 (see FIG. 4A).

The disc spring 7 is provided at a radially outer surface of the thrust member 6 and arranged between the thrust member 6 and the intermediate plate 8 (see FIG. 2). The disc spring 7 biases the thrust member 6 towards the control plate 10. The disc spring 7 is formed with recesses at an inner periphery, the recesses respectively corresponding to the detent portions 6a of the thrust member 6. The detent portions 6a of the thrust member 6 are fitted into the recesses of the disc spring 7, respectively, so that the disc spring 7 is prohibited from rotating relative to the thrust member 6 and allowed to be move in the axial direction.

The intermediate plate 8 is a ring-shaped member provided at radially outer surface of the thrust member 6 and arranged between the disc springs 7 and 9 (see FIG. 2). The intermediate plate 8 receives a biasing force of the disc spring 9 and reacts to push the disc spring 7 towards the thrust member 6. The intermediate plate 8 is formed with recesses at an inner periphery, the recesses respectively corresponding to the detent portions 6a of the thrust member 6, respectively. The detent portions 6a of the thrust member 6 are fitted into the recesses of the intermediate plate 8, respectively, so that the intermediate plate 8 is prohibited from rotating relative to the thrust member 6 and allowed to move in the axial direction.

The disc spring 9 is provided at a radially outer surface of the thrust member 6 and arranged between the side-plate 4 and the intermediate plate 8 (see FIG. 2). The disc spring 9 biases the disc spring 7 towards the control plate 10 via the intermediate spring 8. The disc spring 9 is formed with recesses at an inner periphery, the recesses respectively corresponding to the detent portions 6a of the thrust member 6. The detent portions 6a of the thrust member 6 are fitted into the recesses of the disc spring 9, respectively, so that the disc spring 9 is prohibited from rotating relative to the thrust member 6 and allowed to move in the axial direction.

The control plate 10 is a ring-shaped plate provided at a radially outer surface of the thrust member 12, which will be described later, and arranged between the disc spring 11 and the thrust member 6 (see FIG. 2). The control plate 10 is biased by the disc plate 11 towards the thrust member 6 and is slidably in contact therewith. The control plate 10 is formed with recesses at an inner peripheral end portion, the recesses corresponding to detent portions of the thrust member 12, which will be described later. The detent portions of the thrust member 12 are fitted into the recesses of the control plate 10, respectively, so that the control plate 10 is prohibited from rotating relative to the thrust member 12 and allowed to move in the axial direction. The control plate 10 is fixedly staked to the pin members 16 at a vicinity of its outer circumferential end portion, hence the control plate 10 is structured to be integral with the control plate 14 by means of the pin members 16.

The disc spring 11 is provided at a radially outer surface of the thrust member 12 and arranged between the control plate 10 and the thrust member 12 (see FIG. 2). The disc spring 11 biases the control plate 10 towards the thrust member 6. The disc spring 11 is formed with recesses at an inner periphery, the recesses corresponding to the detent portions of the thrust member 12. The detent portions of the thrust member 12 are fitted into the recesses of the disc spring 11, respectively, so that the disc spring 11 is prohibited from rotating relative to the thrust member 12 and allowed to move in the axial direction.

The thrust member 12 is provided at the outer periphery of the hub member 3 and arranged between the disc spring 11 and the flange portion 3a of the hub member 3 (see FIG. 2). The thrust member 12 is biased by the disc spring 11 towards the flange portion 3a of the hub member 3. Further, the thrust member 12 is accommodated in the first recess formed at the axially right surface of the flange portion 3a of the hub member 3 and is slidably in contact with the flange portion 3a. A radially inner portion of the thrust member 12 extends towards the thrust member 6 and includes the detent portions for prohibiting the thrust member 12 from rotating relative to the disc spring 11 and the control plate 10, and for allowing the thrust member 12 to move in the axial direction. By forming such detent portions of the thrust member 12, an amount of the members may be reduced and a cost of the torque fluctuation absorbing apparatus 1 may be lowered.

As illustrated in FIGS. 2 and 4B, the thrust member 13 is provided at the outer periphery of the hub member 3 and arranged between the side-plate 5 and the control plate 14. In addition, the thrust member 13 is slidably in contact with the control plate 14. A radially inner portion of the thrust member 13 extends towards the side-plate 5. The thrust member 13 includes the detent portions formed at positions corresponding to the bores formed at the side-plate 5. The detent portions of the thrust member 13 are fitted into the bores formed at the side-plate 5, respectively, hence the thrust member 13 is prohibited from rotating relative to the side-plate 5 and allowed to move in the axial direction. The thrust member 13 is formed with a groove pattern 13a at a surface contacting the control plate 14 (see FIG. 4C).

The control plate 14 is a ring-shaped member provided at the outer periphery of the hub member 3 and arranged between the thrust members 13 and 15 (see FIG. 2). The control plate 14 is slidably in contact with the thrust members 13 and 15. In addition, the control plate 14 is fixedly staked to the pin members 16 at a vicinity of an outer peripheral end portion, hence the control plate 14 is structured to be integral with the control plate 10 by means of the pin members 16.

The thrust member 15 is provided at the outer periphery of the hub member 3 and arranged between the control plate 14 and the flange portion 3a of the hub member 3. The thrust member 15 is accommodated in the second recess formed at the axially left surface of the flange portion 3a of the hub member 3, and is slidably in contact with the flange portion 3a and the control plate 14.

The pin members 16 are provided for integrally fixing the control plates 10 and 14 (see FIG. 2). The control plate 10 is fixedly staked to an axially right end portion of each pin member 16, the right end portion located at the side of the side-plate 4. In the same manner, the control plate 14 is fixedly staked to an axially left end portion of each pin member 16, the left end portion located at the side of the side-plate 5. The diameter of the intermediate portion of each pin member 16 is structured to be large. As described above, the diameter of each window portion 3c formed at the flange portion 3a is formed to be larger than the diameter of the intermediate portion of each pin member 16, so that each pin members 16 is not secured to the flange portion 3a of the hub member 3 and is allowed to move within the window portion 3c of the flange portion 3a.

The spring sheets 17 and 18 are members for structuring the damper mechanism. As illustrated in FIG. 2, the spring sheets 17 and 18 are housed in or accommodated in the window portion formed at each of the flange portion 3a of the hub member 3 and the side-plates 4 and 5. The spring sheet 17 is provided between one end portion of the coil spring 19 and one circumferential end of the window portion of each of the flange portion 3a and the side-plates 4, 5. The spring sheet 18 is provided between the other end portion of the coil spring 19 and the other circumferential end of the window portion of each of the flange portion 3a and the side-plates 4, 5.

The coil springs 19 are members for structuring the damper mechanism. As illustrated in FIGS. 1 and 2, each coil sprig 19 is housed in or accommodated in the window portion formed at each of the side-plate 4, side-plate 5, and the flange portion 3a of the hub member 3, and is in contact with the corresponding spring sheets 17 and 18 which are provided at both end portions of the coil springs 19, respectively. The coil springs 19 contracts when the side-plates 4, 5 and the flange portion 3a of the hub member 3 are relatively moved, and absorbs a shock generated between the side-plates 4, 5 and the flange portion 3a because of a rotational difference.

The elastic members 20 are members for structuring the damper mechanism. Each elastic member 20 is provided at an inner peripheral side of the corresponding coil spring 19. In addition, when the corresponding coil spring 19 contracts, each elastic member 20 makes a contact with the corresponding spring sheets 17 and 18, which are facing with the elastic member 20, and absorbs the shock generated between the side-plates 4, 5 and the flange portion 3a because of the rotational difference.

The rivets 21 are provided for integrally securing the side-plates 4, 5 and the intermediate plate 22 (see FIGS. 1 and 2).

The intermediate plate 22 is an annular plate member, which is arranged between the side-plates 4, 5 and secured therewith by means of the rivets 21 (see FIGS. 1 and 2). The intermediate plate 22 extends radially outwardly, and a radially outer portion of the intermediate plate 22 is arranged between the cover plate 27 and the pressure plate 29. That is to say, the diameter of the intermediate plate 22 is longer than the diameters of the side-plates 4, 5, and the radially outer portion of the intermediate plate 22 is arranged outside in the radial direction thereof with respect to the radially outer portions of the side-plates 4, 5. The frictional members 23 and 24 are fixed to both axial sides (i.e., right and left sides in FIG. 2) of the radially outer portion of the intermediate plate 22, respectively, by means of rivets which are not illustrated.

The frictional member 23 is provided between the intermediate plate 22 and the cover plate 27, and is fixed to the intermediate plate 22 by means of the rivets which are not illustrated (see FIG. 2). The frictional member 23 is slidably in contact with the cover plate 27. Additionally, according to the first embodiment of the present invention, the frictional member 23 is structured to be fixedly adhered to the intermediate plate 22. However, the frictional member 23 may be structured to be fixed to the cover plate 27.

The frictional member 24 is provided between the intermediate plate 22 and the pressure plate 29, and is fixed to the intermediate plate 22 by means of the rivets which are not illustrated (see FIG. 2). The frictional member 24 is slidably in contact with the pressure plate 29. Additionally, according to the first embodiment of the present invention, the frictional member 24 is structured to be fixedly adhered to the intermediate plate 22. However, the frictional member 24 may be structured to be fixed to the pressure plate 29.

The rotational member 25 is an annular member fixed to a rotational shaft (not illustrated) to the engine (not illustrated), by means of the bolts 31, for example (see FIG. 2). The rotational member 25 is formed with threaded bores for threadedly engaging with the bolts 28 at a vicinity of an axially (radially) outer portion. The rotational member 25 is in contact with the support plate 26. Further, as illustrated in FIG. 6, the rotational member 25 is formed with plural window portions 25a at positions respectively corresponding to the plural opening portions 26a of the support plate 26.

The support plate 26 is an annular plate member formed in a predetermined shape. The support plate 26 is provided between the rotational member 25 and the cover plate 27, and fixed to the rotational member 25 with the cover plate 27 by means of the bolts 28 at a vicinity of a radially outer portion of the support plate 26 (see FIGS. 2, 6 and 7). The support plate 26 is formed with the plural opening portions 26a, which are formed at positions respectively corresponding to plural protrusions 29a of the pressure plate 29, which will be described later. The opening portions 26a are structured to prohibit the support plate 26 from rotating relative to the pressure plate 29 and to allow the pressure plate 29 to move in the axial direction. Therefore, any specific structure for prohibiting the pressure plate 29 and the cover plate 27 from relatively rotating at an outer side of the intermediate plate 22 and for allowing the pressure plate 29 and the cover plate 27 to move in the axial direction, is not necessary, thus leading to downsize of an outline of the torque fluctuation absorbing apparatus 1. A radially inner portion of the support plate 26 is separated from the cover plate 27. In addition, the radially inner portion of the support plate 26 is in contact with one end of the disc spring 30 at an axially right surface shown in FIG. 2.

The cover plate 27 is an annular plate member formed in a predetermined shape (see FIGS. 1, 2 and 6). The cover plate 27 is provided between the support plate 26 and collar portions of the bolts 28 at the vicinity of a radially outer portion. Therefore, the cover plate 27 is fixed to the rotational member 25 with the support plate 26 by means of the bolts 28. A radially inner portion of the cover plate 27 is separated from the support plate 26. In addition, the radial inner portion of the cover plate is slidably in contact with the frictional member 23.

The bolts 28 are provided for fixing the support plate 26 and the cover plate 27 to the rotational member 25. The bolts 28 are inserted into bores formed at the support plate 26 and those formed at the cover plate 27, and threadedly engaged with the rotational member 25 (see FIG. 2).

The pressure plate 29 is an annular member provided between the disc spring 30 and the frictional member 24, and is biased towards the frictional member 24 by the disc spring 30 (see FIGS. 2, 6 and 7). The pressure plate 29 is formed with the plural protrusions 29a at an outer peripheral end portion. The plural protrusions 29a are prohibited from rotating relative to the opening portions 26a of the support plate 26 and allowed to move in the axial direction.

The disc spring 30 is provided between the support plate 26 and the pressure plate 29, and biases the pressure plate 29 towards the frictional plate 24.

According to the first embodiment, the bent portion 4b of the side-plate 4 and the engagement portion 6b of the thrust member 6 are overlapped and an axial length of the engagement portion 6b of the thrust member 6 can be reduced, thus leading to save a space of the torque fluctuation absorbing apparatus 1. In addition, any specific structure for prohibiting the pressure plate 29 and the cover plate 27 from relatively rotating at an outer side of the intermediate plate 22 and for allowing the pressure plate 29 and the cover plate 27 to move in the axial direction, is not necessary, thus leading to downsize the outline of the torque fluctuation absorbing apparatus 1.

Figure 8:
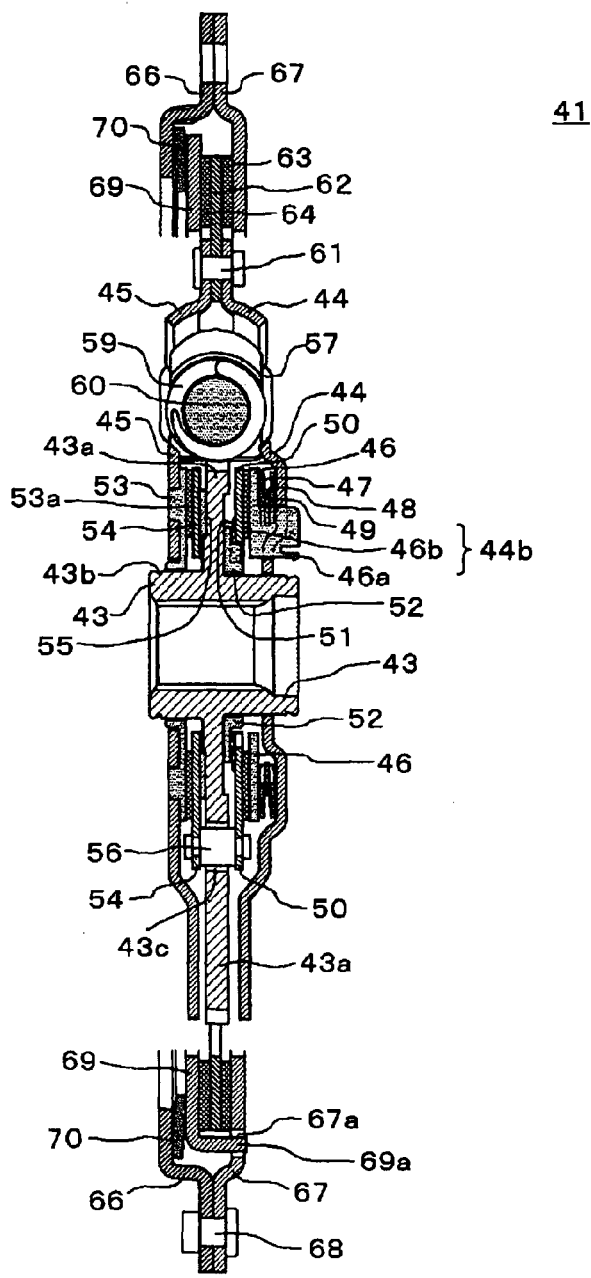
FIG. 8 is a cross sectional view schematically illustrating a structure of a torque fluctuation absorbing apparatus according to a second embodiment.

A second embodiment of a torque fluctuation absorbing apparatus according to the present invention will be described hereinafter with reference FIG. 8. FIG. 8 is a cross sectional view schematically illustrating a structure of a torque fluctuation absorbing apparatus, generally indicated by reference numeral 41, according to the second embodiment.

For example in the hybrid driving apparatus, the torque fluctuation absorbing apparatus 41 according to the second embodiment is provided between the output shaft 100 of the engine (not illustrated) and the input shaft 200 of the transmission (not illustrated) (see FIG. 2) and employed for transmitting the relative torque and for absorbing or controlling the fluctuating torque generated by the engine (not illustrated) and the electric motor (not illustrated). The torque fluctuation absorbing apparatus 41 is operated to absorb or reduce a torque fluctuation and is configured with a hub member 43, a side-plate 44, a side-plate 45, a thrust member 46, a frictional member 46b, a disc spring 47, an intermediate plate 48, a disc spring 49, a control plate 50, a disc spring 51, thrust members 52 and 53, a frictional member 53a, a control plate 54, a thrust member 55, pin members 56, spring sheets 57, coil-springs 59, elastic members 60, rivets 61, an intermediate plate 62, frictional members 63 and 64, a support plate 66, a cover plate 67, rivets 68, a pressure plate 69, and a disc spring 70.

With reference to FIG. 8, the hub member 43 is a member radially inwardly spline-engaged with the input shaft (not illustrated) of the transmission (not illustrated). The hub member 43 includes a flange portion 43a extending radially outwardly. The flange portion 43a is formed with window portions at a radially intermediate area. Each window portion of the flange portion 43a is provided for accommodating the coil spring 59, the spring sheets 57 and the elastic member 60. The coil spring 59, the spring sheets 57 and the elastic member 60 are included in the damper mechanism. In addition, both circumferential ends of each window portion of the flange portion 43a separably contact with the spring sheets 57, respectively. More specifically, when the torsional force is generated and one of the spring sheets 57 is separated from the corresponding circumferential end of the window portion, the other of the spring sheets 57 is in contact with the other corresponding circumferential end of the window portion. The flange portion 43a further includes a first recess at an axially right surface as shown in FIG. 8 and at an area of the surface where the thrust member 52 is in contact. Thus, the flange portion 43a is slidably in contact with the thrust member 52 at the first recess. Further, the flange portion 43a includes a second recess at an axially left surface as shown in FIG. 8 and at an area of the surface where the thrust member 55 is in contact. Thus, the flange portion 43a is slidably in contact with the thrust member 55 at the second recess. It is preferable for the first and second recesses of the flange portion 43a to be formed at the vicinity of a radially inner portion of the hub member 43, where strength of the flange portion 43a is less influenced by the torsional force. It is further preferable that a thickness of an area of the flange portion 43a having the first and second recesses is reduced between 15 percent and 50 percent relative to a thickness of the other area of the flange portion 43a not formed with the first and second recesses. Therefore, an axial length of the torque fluctuation absorbing apparatus 41 can be reduced. In addition, the flange portion 43a includes window portions 43c to which the pin members 56 are inserted, respectively. A diameter of each window portion 43c is formed to be larger than a diameter of an intermediate portion of each pin member 56. Accordingly, the window portions 43c guide rotations of the pin members 56 relative to the flange portion 43a. Still further, the hub member 43 includes grooves 43b respectively formed at an outer circumferential surface at both axial ends, thereby preventing the grease from infiltrating.

The side-plate 44 is an annular plate member formed into a predetermined shape. The side-plate 44 is provided at axially right side of the flange portion 43a (i.e., at a right side in FIG. 8). The side-plate 44 includes a plurality of bores. The plurality of bores of the side-plate 44 are fitted with a plurality of detent portions 46a of the thrust member 46, respectively, so that the side-plate 44 is prohibited from rotating relative to the thrust member 46 and is allowed to move in the axial direction. The side-plate 44 is in contact with one end of the disc spring 49 at an axially left surface shown in FIG. 8. The side-plate 44 includes a bent portion 44b which is bent towards the flange portion 43a of the hub member 43 at a radially inner side from an area where the side-plate 4 contacts with the disc spring 49. The plurality of bores are formed at the bent portion 44b, the plurality of bores into which the plurality of detent portions 46a of the thrust member 46 is inserted, respectively. An axial length of the detent portion 46 of the thrust member 6 can be arranged to be smaller because the bores of the side-plate 44 are formed at the bent portion 44b thereof, hence the axial length of the torque fluctuation absorbing apparatus 41 can be reduced. The side-plate 44 includes window portions at its radially intermediate portion. Each window portion of the side-plate 44 is provided for accommodating the coil spring 59, the spring sheets 57, and the elastic member 60. In addition, both circumferential ends of each window portion of the side-plate 44 separably contact with the spring sheets 57, respectively. More specifically, when the torsional force is generated and one of the spring sheets 57 is separated from the corresponding circumferential end of the window portion of the side-plate 44, the other of the spring sheets 57 is in contact with the other corresponding circumferential end of the window portion. The side-plate 44 is secured to the side-plate 45 and the intermediate plate 62 by means of the rivets 61, at a radially outer portion relative to the coil springs 59.

The side-plate 45 is an annular plate member formed into a predetermined shape. The side-plate 45 is provided at axially left side of the flange portion 43a (i.e., at a left side in FIG. 8). The side-plate 45 is in contact with the thrust member 53 at an inner peripheral end and at a proximal area of a radially portion. The side-plate 45 includes bores fitted with detent portions of the thrust member 53, so that the side-plate 45 is prohibited from rotating relative to the thrust member 53 and allowed to move in the axial direction. The side-plate 45 includes window portions at a radially intermediate portion. Each window portion of the side-plate 45 is provided for accommodating the coil spring 59, the spring sheets 57 and the elastic member 60. In addition, both circumferential ends of each window portion of the side-plate 45 separably contact with the spring sheets 57, respectively. More specifically, when the torsional force is generated and one of the spring sheets 57 is separated from the corresponding circumferential end of the window portion of the side-plate 45, the other of the spring sheets 57 is in contact with the other corresponding circumferential end of the window portion. The side-plate 45 is secured to the side-plate 44 and the intermediate plate 62 by means of the rivets 61, at a radially outer portion relative to the coil springs 59.

The thrust member 46 is provided at an outer periphery of the hub member 43 and arranged between the disc spring 47 and the control plate 50. With reference to FIG. 8, the frictional member 46b is adhesively fixed to an axially left surface of the thrust member 46. The frictional member 46b is slidably in contact with the control plate 50. The thrust member 46 is biased towards the control plate 50 by the disc spring 47. The thrust member 46 includes the detent portions 46a at a radially inner portion extending towards the side-plate 44. The detent portions 46a of the thrust member 46 is provided for prohibiting the thrust member 46 from rotating relative to the side-plate 44, the disc springs 47, 49 and the intermediate plate 48 and for allowing the thrust member 46 to move in the axial direction. In addition, the detent portions 46a of the thrust member 46 extend through the bores of the side-plate 44, respectively, and are formed with pawl portions at end portions, respectively. The pawl portions of the detent portions 46a are provided for preventing the detent portions 46 from being released from the side-plate 4.

The disc spring 47 is provided at a radially outer surface of the thrust member 46 and arranged between the thrust member 46 and the intermediate plate 48. The disc spring 47 biases the thrust member 46 towards the control plate 50. The disc spring 47 is formed with recesses at an inner peripheral end portion, the recesses respectively corresponding to the detent portions 46a of the thrust member 46. The detent portions 46a of the thrust member 46 are fitted into the recesses of the disc spring 47, respectively, so that the disc spring 47 is prohibited from rotating relative to the thrust member 46 and allowed to move in the axial direction.

The intermediate plate 48 is a ring-shaped member provided at the radially outer surface of the thrust member 46 and arranged between the disc springs 47 and 49. The intermediate plate 48 receives a biasing force of the disc spring 49 and reacts to push the disc spring 47 towards the thrust member 46. The intermediate plate 48 is formed with recesses at an inner peripheral end portion, the recesses respectively corresponding to the detent portions 46a of the thrust member 46, respectively. The detent portions 46a of the thrust member 46 are fitted into the recesses of the intermediate plate 48, respectively, so that the intermediate plate 48 is prohibited from rotating relative to the thrust member 46 and allowed to move in the axial direction.

The disc spring 49 is provided at the radially outer surface of the thrust member 46 and arranged between the side-plate 44 and the intermediate plate 48. The disc spring 49 biases the disc spring 47 towards the control plate 50 via the intermediate spring 48. The disc spring 49 is formed with recesses at an inner peripheral end portion, the recesses respectively corresponding to the detent portions 46a of the thrust member 46. The detent portions 46a of the thrust member 46 are fitted into the recesses of the disc spring 49, respectively, so that the disc spring 49 is prohibited from rotating relative to the thrust member 46 and allowed to move in the axial direction.

The control plate 50 is a ring-shaped plate provided at a radially outer surface of the thrust member 52 and arranged between the disc spring 51 and the frictional member 46b of the thrust member 46. The control plate 50 is biased by the disc plate 51 towards the thrust member 46 and is slidably in contact with the frictional member 46b of the thrust member 46. The control plate 50 is formed with recesses at an inner peripheral end portion, the recesses corresponding to detent portions of the thrust member 52, which will be described later. The detent portions of the thrust member 52 are fitted into the recesses of the control plate 50, respectively, so that the control plate 50 is prohibited from rotating relative to the thrust member 52 and allowed to move in the axial direction. The control plate 50 is fixedly staked to the pin members 56 at a vicinity of an outer circumferential end portion, hence the control plate 50 is structured to be integral with the control plate 54 by means of the pin members 56.

The disc spring 51 is provided at the radially outer surface of the thrust member 52 and arranged between the control plate 50 and the thrust member 52. The disc spring 51 biases the control plate 50 towards the thrust member 46. The disc spring 51 is formed with recesses at an inner peripheral end portion, the recesses corresponding to the detent portions of the thrust member 46. The detent portions of the thrust member 52 are fitted into the recesses of the disc spring 51, respectively, so that the disc spring 51 is prohibited from rotating relative to the thrust member 52 and allowed to move in the axial direction.

The thrust member 52 is provided at the outer periphery of the hub member 43 and arranged between the disc spring 51 and the flange portion 43a of the hub member 43. The thrust member 52 is biased by the disc spring 51 towards the flange portion 43a of the hub member 43. Further, the thrust member 52 is accommodated in the first recess formed at the axially right surface of the flange portion 43a of the hub member 43 and is slidably in contact with the flange portion 43a. A radially inner portion of the thrust member 52 extends towards the thrust member 46 and includes the detent portions for prohibiting the thrust member 52 from rotating relative to the disc spring 51 and the control plate 50, and for allowing the thrust member 52 to move in the axial direction. By forming such detent portions of the thrust member 52, an amount of the members may be reduced and a cost of the torque fluctuation absorbing apparatus 41 may be lowered.

The thrust member 53 is provided at the outer periphery of the hub member 43 and arranged between the side-plate 45 and the control plate 54. In addition, the frictional member 53a is adhesively fixed to an axially right surface of the thrust member 53 and is slidably in contact with the control plate 54. A radially inner portion of the thrust member 53 extends towards the side-plate 45. The thrust member 53 includes the detent portions formed at positions corresponding to the bores formed at the side-plate 45. The detent portions of the thrust member 53 are fitted into the bores formed at the side-plate 5, respectively, hence the thrust member 53 is prohibited from rotating relative to the side-plate 45 and allowed to move in the axial direction.

The control plate 54 is a ring-shaped member provided at the outer periphery of the hub member 43 and arranged between the frictional member 53a of the thrust members 53 and the thrust member 55. The control plate 54 is slidably in contact with the thrust member 55. In addition, the control plate 54 is slidably in contact with the frictional member 53a adhesively attached to the thrust member 53. Further, the control plate 54 is fixedly staked to the pin members 56 at a vicinity of an outer peripheral end portion, hence the control plate 54 is structured to be integral with the control plate 50 by means of the pin members 56.

The thrust member 55 is provided at the outer periphery of the hub member 43 and arranged between the control plate 54 and the flange portion 43a of the hub member 43. The thrust member 55 is accommodated in the second recess formed at the axially left surface of the flange portion 43a of the hub member 43, and is slidably in contact with the flange portion 43a and the control plate 54.

The pin members 56 are provided for integrally fixing the control plates 50 and 54. With reference to FIG. 8, the control plate 50 is fixedly staked to an axially right end portion of each pin member 56, the right end portion located at the side of the side-plate 44. In the same manner, the control plate 14 is fixedly staked to an axially left end portion of each pin member 56, the left end portion located at the side of the side-plate 45. The diameter of the intermediate portion of each pin member 56 is structured to be large. As described above, the diameter of each window portion 43c formed at the flange portion 43a is formed to be larger than the diameter of the intermediate portion of each pin member 56, so that each pin member 56 is not secured to the flange portion 43a of the hub member 43 and is allowed to move within the window portion 43c of the flange portion 43a.

The spring sheets 57 are members for structuring the damper mechanism. The spring sheets 57 are accommodated in the window portion formed at each of the flange portion 43a of the hub member 43 and the side-plates 44 and 45. The spring sheets 57 are respectively provided between both end portions of the coil spring 19 and both circumferential ends of the window portion of each of the flange portion 43a of the hub member 43 and the side-plates 44, 45.

The coil springs 59 are members for structuring the damper mechanism. Each coil spring 59 is accommodated in the window portion formed at each of the side-plate 44, side-plate 45, and the flange portion 43a of the hub member 43, and is in contact with the corresponding spring sheets 57 provided at both end portions of the coil springs 59, respectively. The coil springs 59 contract when the side-plates 44, 45 and the flange portion 43a of the hub member 43 are relatively moved, and absorbs a shock generated between the side-plates 44, 45 and the flange portion 43a because of the rotational difference.

The elastic members 60 are members for structuring the damper mechanism. Each elastic member 60 is provided at an inner peripheral side of the corresponding coil spring 59. In addition, when the corresponding coil spring 59 contracts, each elastic member 60 makes a contact with the corresponding spring sheets 57 facing with the elastic member 60, and absorbs the shock generated between the side-plates 44, 45 and the flange portion 43a because of the rotational difference.

The rivets 61 are provided for integrally securing the side-plates 44, 45 and the intermediate plate 62.

The intermediate plate 62 is an annular plate member, which is arranged between the side-plates 44, 45 and secured therewith by means of the rivets 61. The intermediate plate 62 extends radially outwardly, and a radially outer portion of the intermediate plate 22 is arranged between the cover plate 67 and the pressure plate 69. The frictional members 63 and 64 are fixed to both axial sides (i.e., right and left sides in FIG. 8) of the radially outer portion of the intermediate plate 62, respectively, by means of rivets which are not illustrated.

The frictional member 63 is provided between the intermediate plate 62 and the cover plate 67, and is fixed to the intermediate plate 62 by means of the rivets which are not illustrated. The frictional member 63 is slidably in contact with the cover plate 67.

The frictional member 64 is provided between the intermediate plate 62 and the pressure plate 69, and is fixed to the intermediate plate 62 by means of the rivets which are not illustrated. The frictional member 64 is slidably in contact with the pressure plate 69.

The support plate 66 is an annular plate member formed in a predetermined shape. The support plate 66 is provided between the cover plate 67 and a rotational member, which is not illustrated but is used in the same manner as the rotational member 25 illustrated in FIG. 2, and fixed to the cover plate 67 at a vicinity of a radially outer portion of the support plate 66 by means of fixing members such as the rivets 68 and bolts, which is not illustrated but is used in the same manner as the bolts 28 illustrated in FIG. 2. A radially inner portion of the support plate 66 is separated from the cover plate 67. In addition, the radially inner portion of the support plate 66 is in contact with one end of the disc spring 70 at an axially right surface shown in FIG. 8.

The cover plate 67 is an annular plate member formed in a predetermined shape. The cover plate 67 is fixed to the support plate 66 at a vicinity of a radially outer portion of the cover plate 67 by means of the fixing members such as the rivets 68 and the bolts, which are used in the same manner as the bolts 26 illustrated in FIG. 2. A radially inner portion of the cover plate 67 is separated from the support plate 66. In addition, the radial inner portion of the cover plate 67 is slidably in contact with the frictional member 63. The cover plate 67 includes bores 7a at positions corresponding to pawl portions 69a formed at the pressure plate 69. The pawl portions 69a of the pressure plate 69 are inserted into the bores 67a of the cover plate 67, respectively. Thus, the bores 67a are structured to prohibit the cover plate 67 from rotating relative to the pressure plate 69, and to allow the cover plate 67 to move in the axial direction.

The rivets 68 are provided for integrally fixing the support plate 66 and the cover plate 67. The rivets 68 are inserted into bores formed at the support plate 66 and those formed at the cover plate 67, and fixedly stakes the support plate 66 and the cover plate 67.

The pressure plate 69 is an annular member provided between the disc spring 70 and the frictional member 74, and is biased towards the frictional member 64 by the disc spring 70. The pressure plate 69 is formed with the plural pawl portions 69a at an outer peripheral end portion. Each pawl portion 69a is formed by bending the cover plate 67 at a radially outer portion relative to the intermediate plate 67. End portion of each pawl portion 69a are inserted into the bore 67a of the cover plate 67, and is structured to prohibit the pressure plate 69 from rotating relative to the cover plate 67, and to allow the pressure plate 69 to move in the axial direction.

The disc spring 70 is provided between the support plate 66 and the pressure plate 69, and biases the pressure plate 69 towards the frictional member 64.

According to the second embodiment, an axial length of the detent portion 46a of the thrust member 46 can be reduced, thus leading to save space of the torque fluctuation absorbing apparatus 41.

Figure 9A:
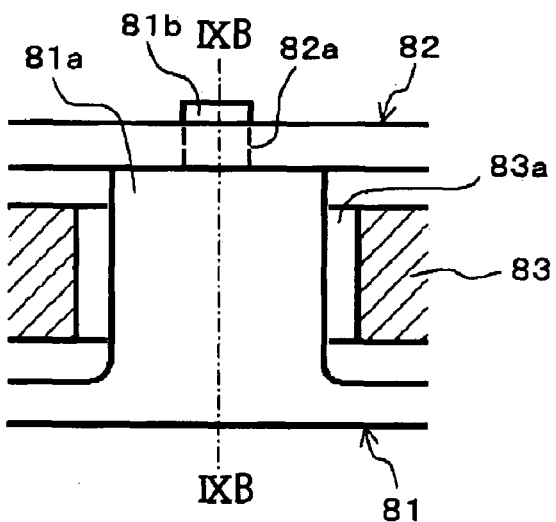
FIG. 9A is a partial plan view schematically illustrating a connection structure of control plates of a torque fluctuation absorbing apparatus according to a third embodiment.

A third embodiment of a torque fluctuation absorbing apparatus according to the present invention will be described hereinafter with reference to FIGS. 9A and 9B. FIG. 9A is a partial plan view and FIG. 9B is a partial cross-sectional view taken along the line IXB-IX B, both which schematically show a connection structure of control plates of the torque fluctuation absorbing apparatus according to the third embodiment.

Figure 9B:
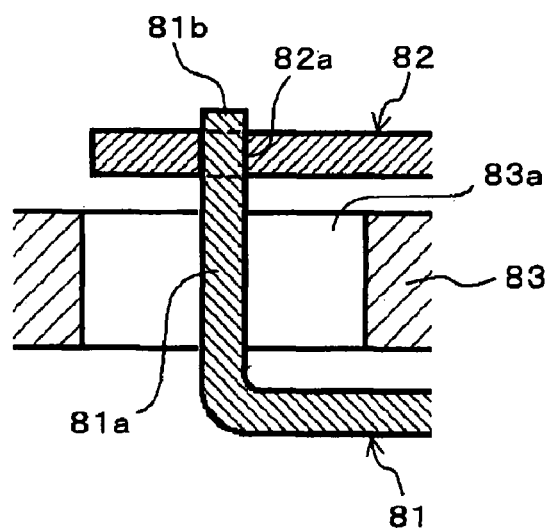
FIG. 9B is a partial cross-sectional view schematically illustrating the connection structure of the control plates of the torque fluctuation absorbing apparatus taken along the line IXB-IXB, according to the third embodiment.

According to the torque fluctuation absorbing apparatus of the third embodiment, the connection structure (pin fixation) of control plates in the first and second embodiments is arranged as control plates 81 and 82 illustrated in FIGS. 9A and 9B. Other components are used in the same manner as the first and second embodiments.

The control plate 81 includes bent portions 81a formed by bending a radially outer end portion of the control plate 81 towards a flange portion 83 of a hub member. The flange portion 83 of the hub member is formed with window portions 83a in the same manner as the window portions 3c illustrated in FIG. 2 and the window portions 43c illustrated in FIG. 8. Each bent portion 81a of the control plate 81 is inserted into the window portion 83a of the flange portion 83, and includes a protrusion 81b at an end portion of the bent portion 81. The protrusion 81b of the control plate 81 is inserted into and engaged with a bore 82a formed at the control plate 82. The control plate 82 is formed with the bores 82a at positions corresponding to the protrusions 81b of the control plate 81. The bore 82a, through which the protrusion 81b of the control plate 81 is inserted and engaged, is fixed to the protrusion 81b. Thus, the control plates 81 and 82 are integrally secured.

According to the third embodiment, a cost for the control plates 81 and 82 can be reduced. Further, an axial length of the torque fluctuation controlling apparatus can be reduced by omitting pin members.

Figure 10A:
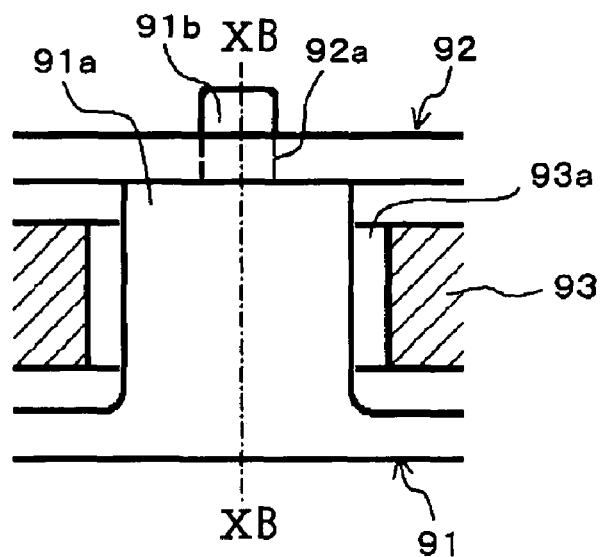
FIG. 10A is a partial plan view schematically illustrating a connection structure of control plates of a torque fluctuation absorbing apparatus according to a fourth embodiment.

A fourth embodiment of a torque fluctuation absorbing apparatus according to the present invention will be described hereinafter with reference to FIGS. 10A and 10B. FIG. 10A is a partial plan view and FIG. 10B is a partial cross-sectional view taken along the line XB-X B, both which schematically show a connection structure of control plates of the torque fluctuation absorbing apparatus according to the fourth embodiment.

Figure 10B:
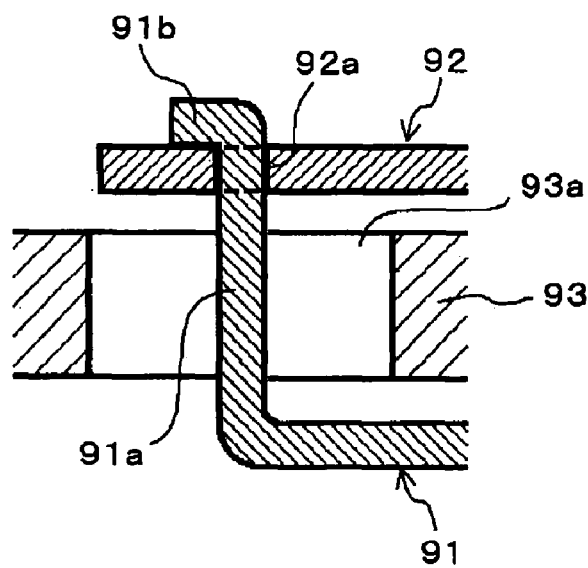
FIG. 10B is a partial cross-sectional view schematically illustrating the connection structure of the control plates of the torque fluctuation absorbing apparatus taken along the line XB-XB, according to the fourth embodiment.

According to the torque fluctuation absorbing apparatus of the fourth embodiment, the connection structure (pin fixation) of control plates in the first and second embodiments is arranged as control plates 91 and 92 illustrated in FIGS. 10(A) and 10(B). Other components are used in the same manner as the first and second embodiments.

The control plate 91 includes bent portions 91a formed by bending a radially outer end portion of the control plate 91 towards a flange portion 93 of a hub member. The flange portion 93 of the hub member is formed with window portions 93a in the same manner as the window portions 3c illustrated in FIG. 2 and the window portions 43c illustrated in FIG. 8. Each bent portion 91a of the control plate 91 is inserted into the corresponding window portion 93a of the flange portion 93, and includes a protrusion 91b at an end portion of the bent portion 91a. Each protrusion 91b of the control plate 91 is inserted into each bore 92a formed at the control plate 92, and an end portion of the protrusion 91b is deformed, for example by bending, staking, or the like. Thus, because the end portion of the protrusion 91b is deformed, the control plate 92 is fixed between the deformed portion of the protrusion 91b and a peripheral end surface of the bent portion 91a, of the control plate 91. The control plate 92 is formed with the bores 92a at positions corresponding to the protrusions 91b of the control plate 91. As described above, the protrusion 91b of the control plate 91 is inserted through the corresponding bore 92a of the control plate 92, and the control plates 91 and 92 are integrally secured.

According to the fourth embodiment, a cost for the control plates 91 and 92 can be reduced. Further, an axial length of the torque fluctuation controlling apparatus can be reduced by omitting pin members.

Figure 11A:
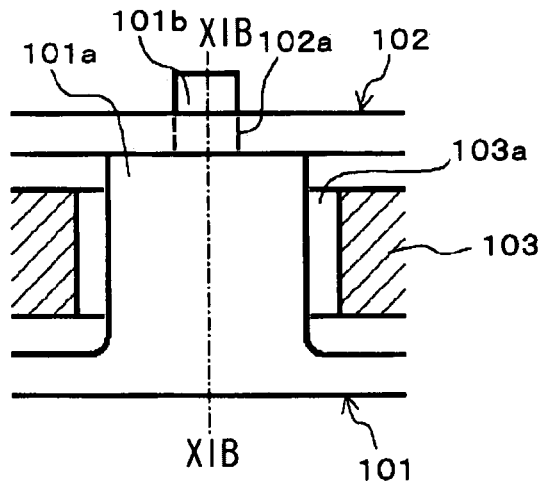
FIG. 11A is a partial plan view schematically illustrating a connection structure of control plates of a torque fluctuation absorbing apparatus according to a fifth embodiment.
Figure 11B:
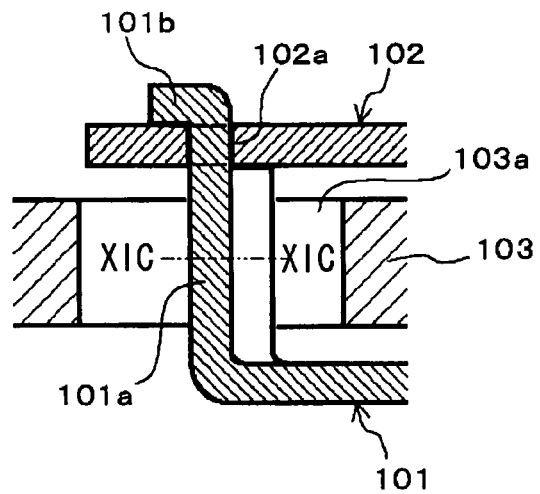
FIG. 11B is a partial cross-sectional view schematically illustrating the connection structure of the control plates of the torque fluctuation absorbing apparatus taken along the line XIB-XIB, according to the fifth embodiment.
Figure 11C:
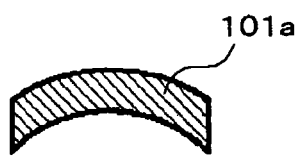
FIG. 11C is a partial cross sectional view schematically illustrating a structure of the control plate of the torque fluctuation absorbing apparatus taken along the line XIC-XIC, according to the fifth embodiment.

A fifth embodiment of a torque fluctuation absorbing apparatus according to the present invention will be described hereinafter with reference to FIGS. 11A, 11B and 11C. FIG. 11A is a partial plan view and FIG. 11B is a partial cross-sectional view taken along the line XIB-XIB, both which schematically illustrate a connection structure of control plates of the torque fluctuation absorbing apparatus according to the fifth embodiment. FIG. 11C is a partial cross sectional view schematically illustrating a structure of the control plate taken along the line XIC-XIC.

According to the torque fluctuation absorbing apparatus of the fourth embodiment, the connection structure (pin fixation) of control plates in the first and second embodiments is arranged as control plates 101 and 102 illustrated in FIGS. 11(A), 11(B) and 11(C). Other components are used in the same manner as the first and second embodiments.

The control plate 101 includes bent portions 101a formed by bending a radially outer end portion of the control plate 101 towards a flange portion 103 of a hub member. The flange portion 103 of the hub member is formed with window portions 103a in the same manner as the window portions 3c illustrated in FIG. 2 and the window portions 43c illustrated in FIG. 8. As best shown in FIG. 1C, a cross section of the bent portions 101a are formed into curved shape by drawing process and inserted into the window portions 103a of the flange portion 103, respectively. Each bent portion 101a of the control plate 101 includes a protrusion 101b at an end portion of the bent portion 101a. The protrusions 101b of the control plate 101 are inserted into bores 102a formed at the control plate 102, respectively, and an end portion of each protrusion 101b is deformed, for example by bending, staking, or the like. Thus, because the end portion of the protrusion 101b is deformed, the control plate 102 is fixed between the deformed portion of the protrusion 101b and a peripheral end surface of the bent portion 101a, of the control plate 101. A thickness of the deformed portion of the protrusion 101b is arranged to be between 30 percents and 80 percent of a thickness of the bent portion 101a. The control plate 102 is formed with the bores 102a at positions corresponding to the protrusions 101b of the control plate 101. As described above, the protrusions 101b of the control plate 101 are inserted through the bores 102a of the control plate 102, respectively, and the control plates 101 and 102 are integrally secured.

According to the fifth embodiment, a cost for the control plates 101 and 102 can be reduced, and an axial length of the torque fluctuation controlling apparatus can be reduced by omitting pin members. In addition, because the bent portion 101a of the control plate 101 is curved, rigidity of the control plate 101 is increased. Therefore, when the protrusion 101b is deformed, the bent portion 101a of the control plate 101 is prevented from being deformed and a height thereof is prevented from being changed.

Figure 12A:
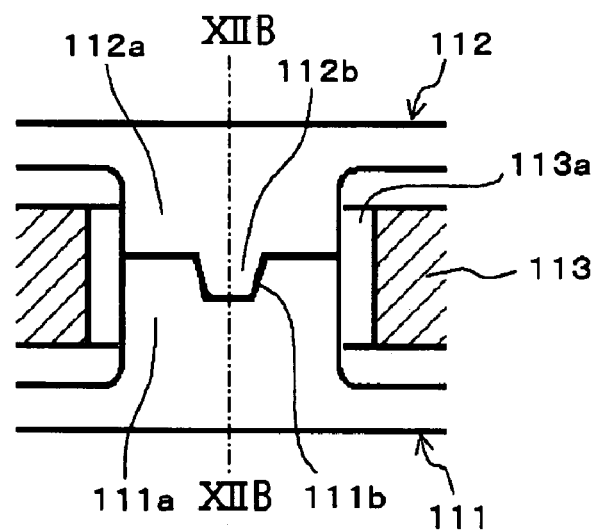
FIG. 12A is a partial plan view schematically illustrating a connection structure of control plates of a torque fluctuation absorbing apparatus according to a sixth embodiment.

A sixth embodiment of a torque fluctuation absorbing apparatus according to the present invention will be described hereinafter with reference to FIGS. 12A and 12B. FIG. 12A is a partial plan view and FIG. 12B is a partial cross-sectional view taken along the line XIIB-XIIB, both which schematically show a connection structure of control plates of the torque fluctuation absorbing apparatus according to the sixth embodiment.

Figure 12B:
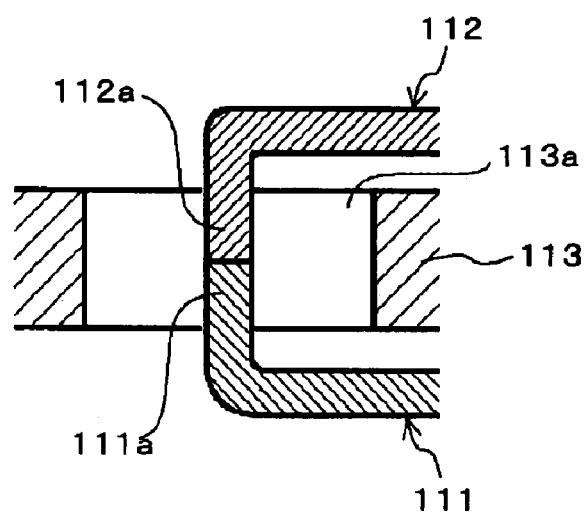
FIG. 12B is a partial cross-sectional view schematically illustrating the connection structure of the control plates of the torque fluctuation absorbing apparatus taken along the line XIIB-XIIB, according to the sixth embodiment.

According to the torque fluctuation absorbing apparatus of the sixth embodiment, the connection structure (pin fixation) of control plates in the first and second embodiments is arranged as control plates 111 and 112 illustrated in FIGS. 12A and 12B. Other components are used in the same manner as the first and second embodiments.

The control plate 111 includes bent portions 111a formed by bending a radially outer end portion of the control plate 111 towards a flange portion 113 of a hub member. The flange portion 113 of the hub member is formed with window portions 113a in the same manner as the window portions 3c illustrated in FIG. 2 and the window portions 43c illustrated in FIG. 8. Each bent portion 111a of the control plate 111 extends in the corresponding window portion 113a of the flange portion 113, and a recess 111b is formed at an end portion of each bent portion 111a of the control plate 111. The recess 111b of the control plate 111 is fitted with and fixed to a protrusion 112b formed at the control plate 112. The control plate 112 includes bent portions 112a formed by bending a radially outer end portion of the control plate 112 towards the flange portion 113 of the hub member. Each bent portion 112a of the control plate 112 extends in the window portion 113a of the flange portion 113, and the protrusion 112b is formed at an end portion of each bent portion 112a of the control plate 112. The protrusion 112b fits into the recess 111b of the control plate 111 and is fixed thereto. A fitting portion, where the recess 111b of the control plate 111 and the protrusion 112b of the control plate 112 are fitted and fixed to one another, is arranged inside the window portion 113a of the flange portion 113.

According to the sixth embodiment, a cost for the control plates 111 and 112 can be reduced. Further, an axial length of the torque fluctuation controlling apparatus can be reduced by omitting pin members.

Figure 13A:
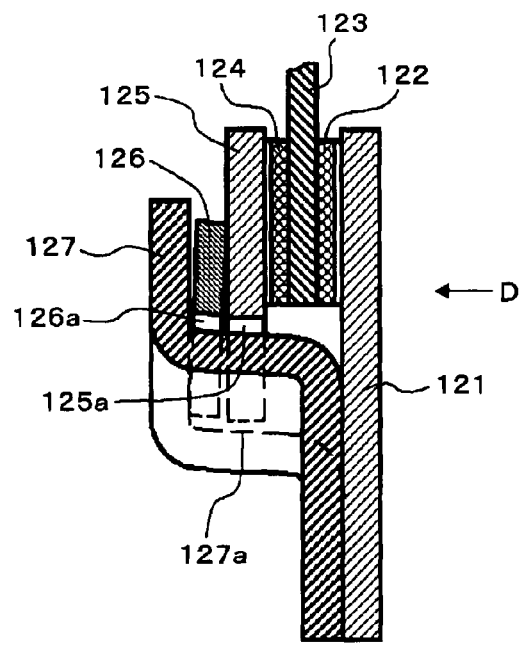
FIG. 13A is a partial cross-sectional view schematically illustrating a structure between a pressure plate, a disc spring and a support plate, of a torque fluctuation absorbing apparatus according to a seventh embodiment.
Figure 13B:
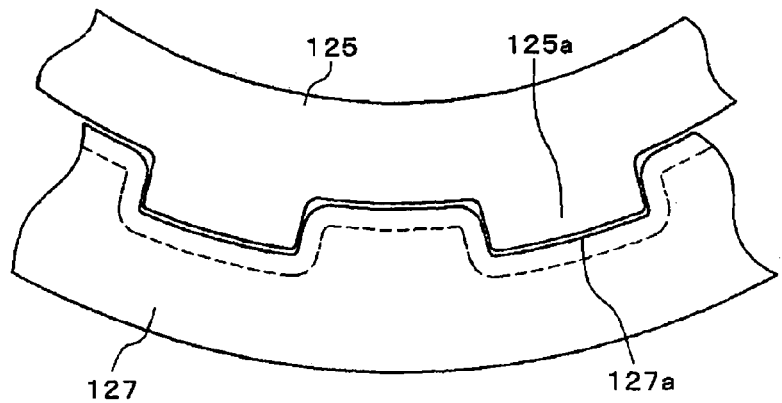
FIG. 13B is a partial plan view schematically illustrating the structure between the pressure plate, the disc spring and the support plate, of the torque fluctuation absorbing apparatus seen from an allow D illustrated in FIG. 13A, according to the seventh embodiment.

A seventh embodiment of a torque fluctuation absorbing apparatus according to the present invention will be described hereinafter with reference to FIGS. 13A and 13B. FIG. 13A is a partial cross-sectional view and FIG. 13B is a partial plan view seen from an allow D illustrated in FIG. 13A, both which schematically illustrate a structure between a pressure plate, a disc spring and a support plate, of the torque fluctuation absorbing apparatus according to the seventh embodiment. In FIG. 13B, a cover plate 121, a frictional member 122 (serving as a first frictional member), an intermediate plate 123 and a frictional member 124 (serving as a second frictional member) are not illustrated.

According to the torque fluctuation absorbing apparatus of the seventh embodiment, the structure between the pressure plate, the disc spring and the support plate in the first and second embodiments is arranged as a pressure plate 125, a disc spring 126 (serving as a second disc spring) and a support plate 127 illustrated in FIGS. 13(A) and 13(B). Other components are used in the same manner as the first and second embodiments.

The pressure plate 125 is an annular member provided between the disc spring 126 and the frictional member 124, and is biased towards the frictional member 124 by the disc spring 126. The pressure plate 125 is formed with a plurality of protrusions 125a at an outer peripheral end portion. The protrusion 125a of the pressure plate 125 are structured for prohibiting the pressure plate 125 from rotating relative to recesses 127a formed at the support plate 127, and for allowing the pressure plate 125 to move in the axial direction.

The disc spring 126 is provided between the support plate 127 and the pressure plate 125, and biases the pressure plate 125 towards the frictional member 124. The disk spring 126 is formed with a plurality of protrusions 126a at an outer peripheral end portion. The protrusions 126a are structured for prohibiting the disk spring 126 from rotating relative to recesses 127a of the support plate 127 and for allowing the disk spring 126 to move in the axial direction.

The support plate 127 is an annular plate member formed in a predetermined shape. The support plate 127 is in contact with a cover plate 121 at a vicinity of a radially outer portion and is fixed to the cover plate 121 by means of fixing members such as bolts (not illustrated) and rivets (not illustrated). The support plate 127 is formed with the plurality of recesses 127a at positions corresponding to the plurality of protrusions 125a of the pressure plate 125 and the plurality of protrusions 126a of the disk spring 126. Thus, the recesses 127a is structured for prohibiting the support plate 127 from rotating relative to the pressure plate 125 and the disk spring 126 and for allowing the support plate 127 to move in the axial direction. A radially inner portion of the support plate 127 is separated from the cover plate 121. In addition, the support plate 127 is in contact with one end of the disk spring 126 at an axially right surface shown in FIG. 13A.

According to the seventh embodiment, any specific structure, for prohibiting the pressure plate 125 and the cover plate 127 from relatively rotating at an outer side of the intermediate plate 123 and for allowing the pressure plate 125 and the cover plate 127 to move in the axial direction, is not necessary, thus leading to downsize the outline of the torque fluctuation absorbing apparatus. In addition, a reliability for holding the disc plate 126 is increased.

Figure 14:
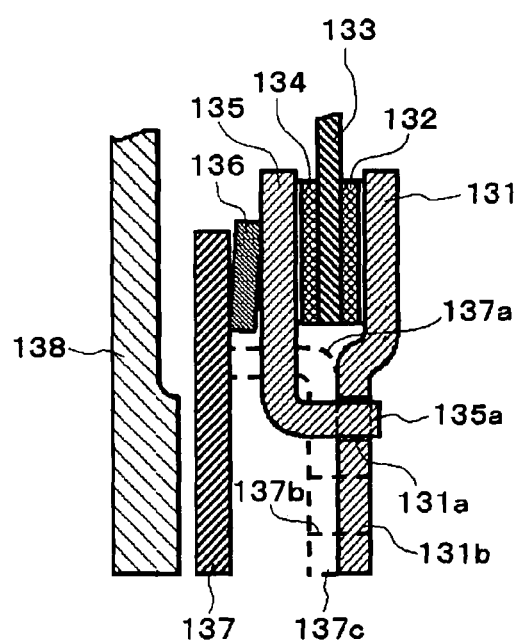
FIG. 14 is a partial plan view schematically illustrating a structure between a cover plate, a pressure plate, and a support plate, of a torque fluctuation absorbing apparatus according to an eighth embodiment.

An eighth embodiment of a torque fluctuation absorbing apparatus according to the present invention will be described hereinafter with reference to FIG. 14. FIG. 14 is a partial plan view schematically illustrating a structure between a cover plate, a pressure plate, and a support plate, of the torque fluctuation absorbing apparatus according to the eighth embodiment.

According to the torque fluctuation absorbing apparatus of the eighth embodiment, the structure between the cover plate, the pressure plate and the support plate in the first and second embodiments is arranged as a cover plate 131, a pressure plate 135 and a support plate 137 illustrated in FIG. 14. Other components are used in the same manner as the first and second embodiments.

The cover plate 131 is an annular plate member formed in a predetermined shape. The cover plate 131 is formed with rivet bores 131b at positions corresponding to rivet bores 137b of the support plate 137, the rivet bores 137b formed at flat portions 137c. The cover plate 131 is connected to the support plate 137 by means of rivets (not illustrated) through the rivet bores 137b of the support plate 137 and the rivet bores 131b of the cover plate 131. A radially inner portion of the cover plate 131 is slidably in contact with a frictional member 132 (serving as a first frictional member). The cover plate 131 includes bores 131a at positions corresponding to pawl portions 135a formed at the pressure plate 135. The pawl portions 135a of the pressure plate 135 are inserted into bores 131a of the cover plate 135 and bores 137a formed at the support plate 137, respectively. So configured, the pressure plate 135 is engaged with the cover plate 131 and the one part of the radially outer portion of the support plate 137 so as to be prohibited from relatively rotating and to be allowed to move in the axial direction. Thus, the cover plate 131 can be secured to the support plate 137 at fixing portions where the rivets (not illustrated) are inserted at an outer circumferential portion of the support plate 137 as well as engagement portions where the pawl portions 135a of the pressure plate 135 are engaged with the cover plate 131 and the support plate 137. Accordingly, the engagement portions and the fixing portions of the cover plate 131, the pressure plate 135 and the support plate 137 are prevented from being arranged in line in the radial direction, and a radial length of the torque fluctuation absorbing apparatus may be reduced. It is preferable that the bores 131a are provided at positions where acting force is not generated.

The pressure plate 135 is an annular member provided between a disc spring 136 (serving as a second disc spring) and a frictional member 134 (serving as a second frictional member), and is biased towards the frictional member 134 by the disc spring 136. The pressure plate 135 is formed with the plural pawl portions 135a at an outer peripheral end portion. Each pawl portion 135a is formed by bending the pressure plate 135 towards the cover plate 131 at a radially outer portion relative to the intermediate plate 133. End portion of each pawl portion 135a is inserted into the corresponding bore 137a of the cover plate 137 and the corresponding bore 131a of the cover plate 131, and is structured to prohibit the pressure plate 135 from rotating relative to the cover plate 131 and the support plate 137, and to allow the pressure plate 135 to move in the axial direction.

The support plate 137 is an annular plate member formed in a predetermined shape. The support plate 137 is formed with the flat portions 137c at a vicinity of a radially outer portion by partially bending the outer circumferential portion of the support plate 137 towards the cover plate 131. The flat portions 137c are formed with the rivet bores 137b at positions corresponding to the rivet bores 131b formed at the cover plate 131. The support plate 137 is connected to the cover plate 131 by the rivets (not illustrated) through the rivet bores 137b and 131b. In addition, the support plate 137 is formed with the bores 137a at positions corresponding to the pawl portions 135a of the pressure plate 135. The pawl portions 135a of the pressure plate 135 are inserted into bores 137a of the support plate 137, respectively, and the support plate 137 is structured to be prohibited from rotating relative to the pressure plate 135 and to be allowed to move in the axial direction. In addition, the support plate 137 is in contact with one end of the disk spring 136 at an axially right surface shown in FIG. 14(A).

According to the eighth embodiment of the present invention, a thickness of the cover plate can be reduced.

As described above, according to the present invention, the torque fluctuation absorbing apparatus 1 is characterized in that the engagement portion 6b of the thrust member 6 is formed at an inner circumferential portion of the thrust member 6, and the bore 4a of the side-plate 4 is formed at a vicinity of the hub member 3.

Further according to the present invention, the torque fluctuation absorbing apparatus 1 further includes the intermediate plate 22, the cover plate 27, the pressure plate 29, the support plate 26, and the second disc spring 30. The intermediate plate 22 is secured to the side-plates 4, 5 and extends radially outwardly relative to the side-plates 4, 5. The cover plate 27 is connected to the output shaft 100 of the engine (not illustrated) and is slidably in contact with the frictional member 23. The pressure plate 29 is slidably in contact with the frictional member 24. The support plate 26 is integrally secured to the cover plate 27. The disc spring 30 is provided between the pressure plate 29 and the support plate 26 and biases the pressure plate 26 towards the frictional member 24. In addition, the torque fluctuation absorbing apparatus 1 of the present invention is characterized in that the pressure plate 29 includes a plurality of protrusions 29a at an outer periphery, and the support plate 26 includes a plurality of opening portions 26a corresponding to the plurality of protrusions 29a of the pressure plate 29 and is structured to be prohibited from rotating relative to the pressure plate 29 and allowed to move in the axial direction.

Still further according to the present invention, the torque fluctuation absorbing apparatus further includes the intermediate plate 123, the cover plate 121, the pressure plate 125, the support plate 127 and the disc spring 126. The intermediate plate 123 is secured to the side-plates and extends radially outwardly relative to the side-plates. The cover plate 121 is connected to the output shaft 100 of the engine (not illustrated) and is slidably in contact with the frictional member 122. The pressure plate 125 is slidably in contact with the frictional member 124. The support plate 127 is integrally secured to the cover plate 121. The disc spring 126 is provided between the pressure plate 125 and the support plate 127 and biases the pressure plate 125 towards the frictional member 124. In addition, the pressure plate 125 includes a plurality of protrusions 125s at an outer periphery, and the support plate 127 includes a plurality of recesses 127a corresponding to the plurality of protrusions 125a of the pressure plate 125 and is structured to be prohibited from rotating relative to the pressure plate 125 and allowed to move in the axial direction.

Still further according to the present invention, the torque fluctuation absorbing apparatus is characterized in that the disc plate 126 includes a plurality of protrusions 126a at the outer periphery. Further, the plurality of recesses 127a of the support plate 127 corresponds to the plurality of protrusions 126a of the disc plate 126. In addition, the support plate 127 is structured to be prohibited from rotating relative to the disc spring 126 and allowed to move in the axial direction.

Still further according to the present invention, the torque fluctuation absorbing apparatus further includes the intermediate plate 133, the cover plate 131, the pressure plate 135, the support plate 137 and a disc spring 136. The intermediate plate 133 is secured to the side-plates and extends radially outwardly relative to the side-plates. The cover plate is connected to the output shaft 100 of the engine (not illustrated) and is slidably in contact with the frictional member 132. The pressure plate 135 is slidably in contact with the frictional member 134. The support plate 137 is integrally secured to the cover plate 131. The disc spring 136 is provided between the pressure plate 135 and the support plate 137 and biases the pressure plate 135 towards the frictional member 134. In addition, the torque fluctuation absorbing apparatus is characterized in that the pressure plate 135 includes, at an outer periphery, a pawl portion 135a bent towards the cover plate 131, and each of the support plate 137 and the cover plate 131 includes a bore 137a, 131a, formed at a position corresponding to the pawl portion 135a of the pressure plate 135 and is structured to be prohibited from rotating relative to the pressure plate 135 and allowed to move in the axial direction. Due to the above described structure, an axial length of a portion of the thrust member, for preventing the thrust member from being released from the first side-plate, can be reduced, thus leading to save space of the torque fluctuation absorbing apparatus.

Due to the above described structure, the axial length of a portion of the thrust member, for preventing the thrust member from being released from the side-plate, can be reduced, thus leading to save space of the torque fluctuation absorbing apparatus.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorbing apparatus arranged between a driving-side member and a driven-side member and transmitting a relative torque generated between the driving-side member and the driven-side member, the torque fluctuation absorbing apparatus absorbing a fluctuation of the relative torque, comprising:
   a hub member connected to the driven-side member, the hub member defining an axis and including a flange portion extending radially outwardly from the axis;
   first and second side-plates connected to the driving-side member and provided at both axial sides of the flange portion of the hub member, respectively;
   a damper mechanism housed in a window portion formed at each of the first and second side-plates and the flange portion of the hub member, the damper mechanism absorbing a fluctuation of a relative torque generated between the flange portion of the hub member and the first and second side-plates;
   a thrust member provided between the first side-plate and the flange portion of the hub member; and
   a first disc spring provided between the first side-plate and the thrust member and biasing the thrust member towards the flange portion of the hub member,
   wherein the first side-plate includes a bent portion bent towards the flange portion of the hub member with respect to an axial direction of the hub and a bore being formed at the bent portion, and the thrust member is formed with an engagement portion extending through the bore of the first side-plate and engaged with the bore of the first side-plate, the thrust member being formed with a detent portion protruding in the axial direction radially between respective portions of the hub member and the first side plate, the detent portion being offset radially inwardly with respect to the engagement portion and engaging the first side plate.

2. A torque fluctuation absorbing apparatus according to claim 1, wherein
   the engagement portion of the thrust member is formed at an outer circumferential portion of the thrust member, wherein the detent portion protrudes through a radially inner portion of the first side plate, a radially outer portion of the bore being disposed axially closer to the flange portion than is the radially inner portion of the first side plate.

3. A torque fluctuation absorbing apparatus according to claim 2, further comprising:
   an intermediate plate secured to the first and second side-plates and extending radially outwardly relative to the first and second side-plates;
   a cover plate connected to the driving-side member and being slidably in contact with a first frictional member;
   a pressure plate slidably in contact with a second frictional member;

a support plate integrally secured to the cover plate; and a second disc spring provided between the pressure plate and the support plate and biasing the pressure plate towards the second frictional member, wherein the pressure plate includes a plurality of protrusions at an outer periphery, the support plate includes a plurality of opening portions corresponding to the plurality of protrusions of the pressure plate and is structured to be prohibited from rotating relative to the pressure plate and allowed to move in the axial direction.

4. A torque fluctuation absorbing apparatus according to claim 3, wherein the second disc plate includes a plurality of protrusions at an outer periphery, the plurality of recesses of the support plate corresponds to the plurality of protrusions of the second disc plate, and the support plate is structured to be prohibited from rotating relative to the second disc plate and allowed to move in the axial direction.

5. A torque fluctuation absorbing apparatus according to claim 2, further comprising:

an intermediate plate secured to the first and second side-plates and extending radially outwardly relative to the first and second side-plates;

a cover plate being slidably in contact with a first frictional member;

a pressure plate being slidably in contact with a second frictional member;

a support plate integrally secured to the cover plate; and a second disc spring provided between the pressure plate and the support plate and biasing the pressure plate towards the second frictional member, wherein the pressure plate includes a plurality of protrusions at an outer periphery, the support plate includes a plurality of recesses corresponding to the plurality of protrusions of the pressure plate and is structured to be prohibited from rotating relative to the pressure plate and allowed to move in the axial direction.

6. A torque fluctuation absorbing apparatus according to claim 2, further comprising:

an intermediate plate secured to the first and second side-plates and extending radially outwardly relative to the first and second side-plates;

a cover plate being slidably in contact with a first frictional member;

a pressure plate being slidably in contact with a second frictional member;

a support plate integrally secured to the cover plate; and a second disc spring provided between the pressure plate and the support plate and biasing the pressure plate towards the second frictional member, wherein the pressure plate includes, at an outer periphery, a pawl portion bent towards the cover plate, and each of the support plate and the cover plate includes a bore formed at a position corresponding to the pawl portion of the pressure plate and is structured to be prohibited from rotating relative to the pressure plate and allowed to move in the axial direction.

7. A torque fluctuation absorbing apparatus according to claim 2, wherein the detent portion is offset from the engagement portion in a circumferential direction of the thrust member.

8. A torque fluctuation absorbing apparatus according to claim 1, further comprising:

an intermediate plate secured to the first and second side-plates and extending radially outwardly relative to the first and second side-plates;

a cover plate connected to the driving-side member and being slidably in contact with a first frictional member;

a pressure plate slidably in contact with a second frictional member;

a support plate integrally secured to the cover plate; and a second disc spring provided between the pressure plate and the support plate and biasing the pressure plate towards the second frictional member, wherein the pressure plate includes a plurality of protrusions at an outer periphery, the support plate includes a plurality of opening portions corresponding to the plurality of protrusions of the pressure plate and is structured to be prohibited from rotating relative to the pressure plate and allowed to move in the axial direction.

9. A torque fluctuation absorbing apparatus according to claim 8, wherein the second disc plate includes a plurality of protrusions at an outer periphery, the plurality of recesses of the support plate corresponds to the plurality of protrusions of the second disc plate, and the support plate is structured to be prohibited from rotating relative to the second disc plate and allowed to move in the axial direction.

10. A torque fluctuation absorbing apparatus according to claim 1, further comprising:

an intermediate plate secured to the first and second side-plates and extending radially outwardly relative to the first and second side-plates;

a cover plate being slidably in contact with a first frictional member;

a pressure plate being slidably in contact with a second frictional member;

a support plate integrally secured to the cover plate; and a second disc spring provided between the pressure plate and the support plate and biasing the pressure plate towards the second frictional member, wherein the pressure plate includes a plurality of protrusions at an outer periphery, the support plate includes a plurality of recesses corresponding to the plurality of protrusions of the pressure plate and is structured to be prohibited from rotating relative to the pressure plate and allowed to move in the axial direction.

11. A torque fluctuation absorbing apparatus according to claim 1, further comprising:

an intermediate plate secured to the first and second side-plates and extending radially outwardly relative to the first and second side-plates;

a cover plate being slidably in contact with a first frictional member;

a pressure plate being slidably in contact with a second frictional member;

a support plate integrally secured to the cover plate; and a second disc spring provided between the pressure plate and the support plate and biasing the pressure plate towards the second frictional member, wherein the pressure plate includes, at an outer periphery, a pawl portion bent towards the cover plate, and each of the support plate and the cover plate includes a bore formed at a position corresponding to the pawl portion of the pressure plate and is structured to be prohibited from rotating relative to the pressure plate and allowed to move in the axial direction.

12. A torque fluctuation absorbing apparatus according to claim 1, wherein the detent portion is offset from the engagement portion in a circumferential direction of the thrust member.

* * * * *